Patented Aug. 25, 1953

2,650,167

UNITED STATES PATENT OFFICE 2,650,167

METHOD FOR PREPARING FRESH FROZEN SEASONED HAMBURGER

Octave P. Garsaud, Metairie, La.

No Drawing. Application April 25, 1951, Serial No. 222,949

1 Claim. (Cl. 99—194)

The present invention relates to a fresh frozen, seasoned hamburger and method for producing the same and has as its purpose the provision of a fresh frozen, seasoned hamburger patty containing all of the essential ingredients, including the requisite amount of onions to properly flavor the hamburger patty, all in situ in the frozen patty and free from any discoloration or deleterious effect.

While many attempts have heretofore been made to produce frozen hamburger products, difficulties have arisen, particularly with respect to the incorporation of onions therein, because of the tendency of the onions to discolor and sour, giving an undesired flavor to the product when defrosted and cooked for serving.

In its more specific aspects the invention contemplates a fresh frozen, seasoned hamburger patty and the process for its preparation through the medium of which all of the requisite seasoning materials and a quantity of onions for flavoring the hamburger patty are incorporated in the patty prior to freezing under conditions such that the onions are dehydrated and undergo no rehydration so that they subsist as dehydrated onions in the frozen product.

In carrying out the method of the present invention, freshly ground beef is first spread out in a relatively thin layer. To the layer of ground beef there is added small amounts of salt in the form of sodium chloride and monosodium glutamate. At this point the layer is moistened with ice water for the two-fold purpose of reducing the temperature of the ground beef and to carry the seasoning ingredients throughout the mass. After the ice water has been added and the seasoning ingredients thoroughly mixed into the moistened ground beef, the mix is allowed to stand for a short time, preferably from five to ten minutes' duration, to permit the added ingredients to be taken up by the moistened beef. The time period at this stage of the process should not be such as to allow any substantial rise in temperature of the cooled mass. To the cooled mass to which the salt and glutamate have been added there is next added small amounts of dehydrated onions and cereal flakes, corn flakes having been found highly desirable. The addition of the dehydrated onions and cereal flakes should be accompanied with rapid mixing into the cooled mass, followed by immediate formation of the mass into discrete patties of appropriate size which are thereupon immediately subjected to quick freezing at a temperature of the order of −20° F., the rapid mixing in of the dehydrated onions and cereal flakes followed by the quick freezing being effected during a time interval such that the dehydrated onions undergo no substantial rehydration by moisture absorbed from the mix.

While some permissible variations may be made in the precise proportions of the various ingredients, I have found that the following exemplary formula has proved highly efficacious:

Ground beef, 9½ pounds
Salt (NaCl), 3 ounces
Monosodium glutamate, 1½ teaspoons
Ice water, 8 ounces
Dehydrated onions, approximately 1 ounce
Corn flakes, approximately 2 ounces The same proportions should prevail for larger mixes. However, the method has been found to be highly practical in dealing with mixes in about ten pound batches. The batch should always be so controlled that the temperature of the mix does not rise materially during the process and the entire mixing operation is desirably carried out with the batch maintained substantially below room temperature.

The feature of allowing the beef to take up the seasoning agents in the form of salt and glutamate prior to incorporation of the dehydrated onions is important in that it permits the attaining of the full benefit of the seasoning qualities of the salt and glutamate without permitting the moisture inherent in the mix to effect rehydration of the dehydrated onions since the latter are incorporated in the mix only after a time interval has been allowed for the beef to take up the other seasoning agents. Likewise, the cereal flakes are not permitted to become soggy through absorption of moisture from the mix.

Fresh frozen hamburger patties conforming to and prepared pursuant to the method of the present invention have been shown to possess a remarkably acceptable, appetizing flavor when defrosted and directly cooked without the necessity of addition of any other seasoning agent or flavoring material. The housewife or picnicker, in using hamburger patties conforming to the present invention, has a finished article ready to serve merely upon defrosting and cooking this product. It is unnecessary to provide fresh onions or other flavoring materials. The product of this invention has met with remarkable acceptance and constitutes a new, modern, ready prepared, frozen, edible product.

Having thus described my invention, what I claim is:

A method for preparing fresh, frozen, seasoned hamburger patties comprising adding to a mass of ground beef, ingredients including salt and ice water, said ice water being employed in an amount sufficient to reduce the temperature of said mass substantially below room temperature and to carry said salt into said mass of beef, and thoroughly mixing said mass of beef and said ingredients under conditions such that the temperature of said mass does not rise materially, maintaining the cold mixture so-formed without substantial rise in temperature for a period of about five to about ten minutes to permit said ingredients to be taken up by said beef, thereafter rapidly combining with the cold mass of ingredients and beef, small amounts of dehydrated onions sufficient to flavor said hamburger patties, and immediately quick-freezing said dehydrated-onion containing product in the form of patties to produce fresh, frozen, seasoned hamburger containing dehydrated onions which have undergone no substantial rehydration.

OCTAVE P. GARSAUD.

References Cited in the file of this patent

UNITED STATES PATENTS

| Number | Name | Date |
|---|---|---|
| 2,397,446 | Tansley | Mar. 26, 1946 |

OTHER REFERENCES

"Everybody's Cook Book," 1937, by I. E. Lord; published by Harcourt, Brace and Co., New York; pages 492–493, and 494.

"The Boston Cooking School Cook Book," 1945, by F. M. Farmer; published by Garden City Publishing Co., Garden City, N. Y.; p. 304.

"Food Packer," July 1948, page 30, article entitled "Monosodium Glutamate."

"Modern Packaging," September 1948, pp. 108–111, article entitled "Packer's Frozen."

"Modern Encyclopedia of Cooking," 1949, vol. I, by Meta Given; published by J. G. Ferguson & Associates, Chicago, Ill.; p. 190.

"The Hamburger Cook Book," 1950, by E. K. Schwartz; published by Abelard Press, New York; pages 3 to 6 and 11 to 14.